March 4, 1969   J. A. JONES   3,430,983
TRAILER HITCH FOR MOTORCYCLES
Filed Feb. 8, 1967   Sheet 1 of 2
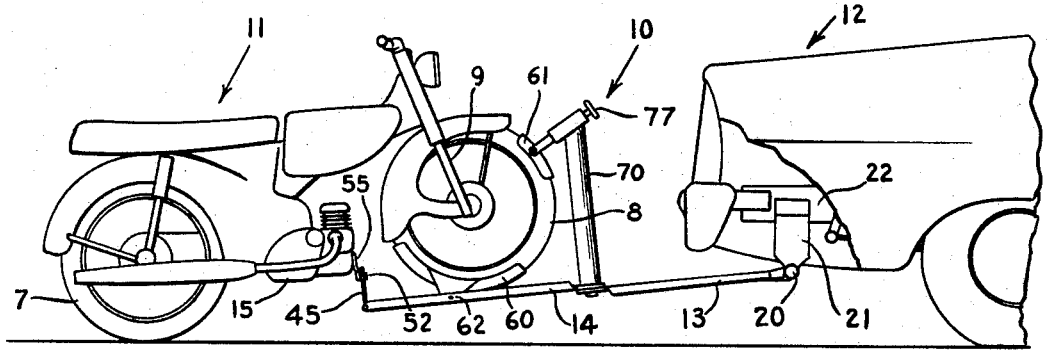
Fig. 1
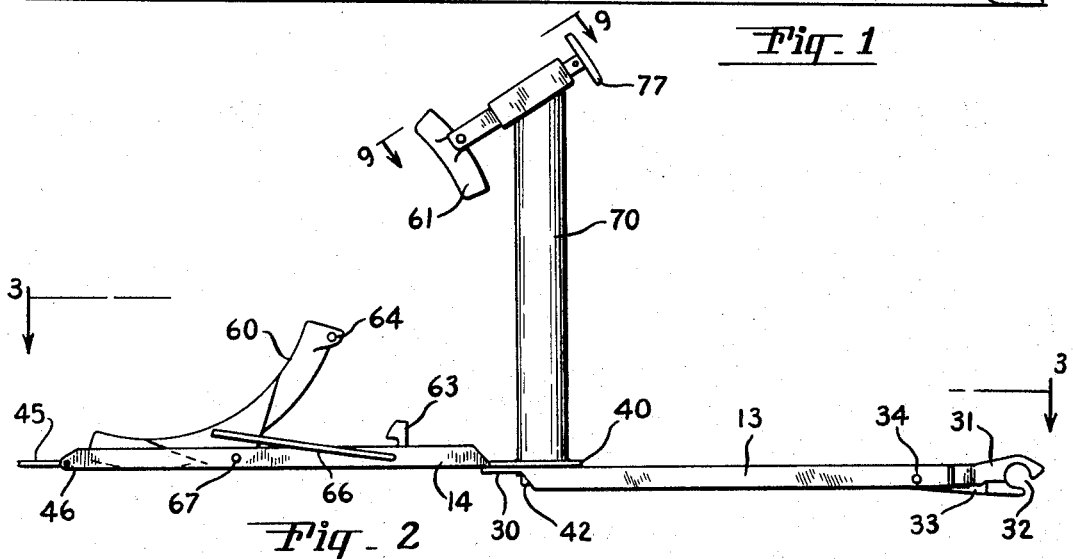
Fig. 2
Fig. 3
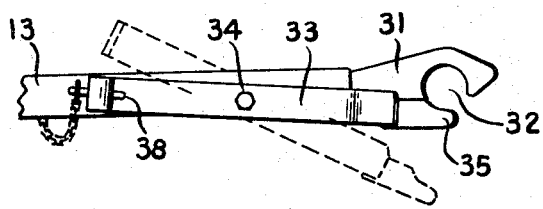
Fig. 6
INVENTOR.
JOHN A. JONES
BY
Lw. R. Schernahorn
Attorney

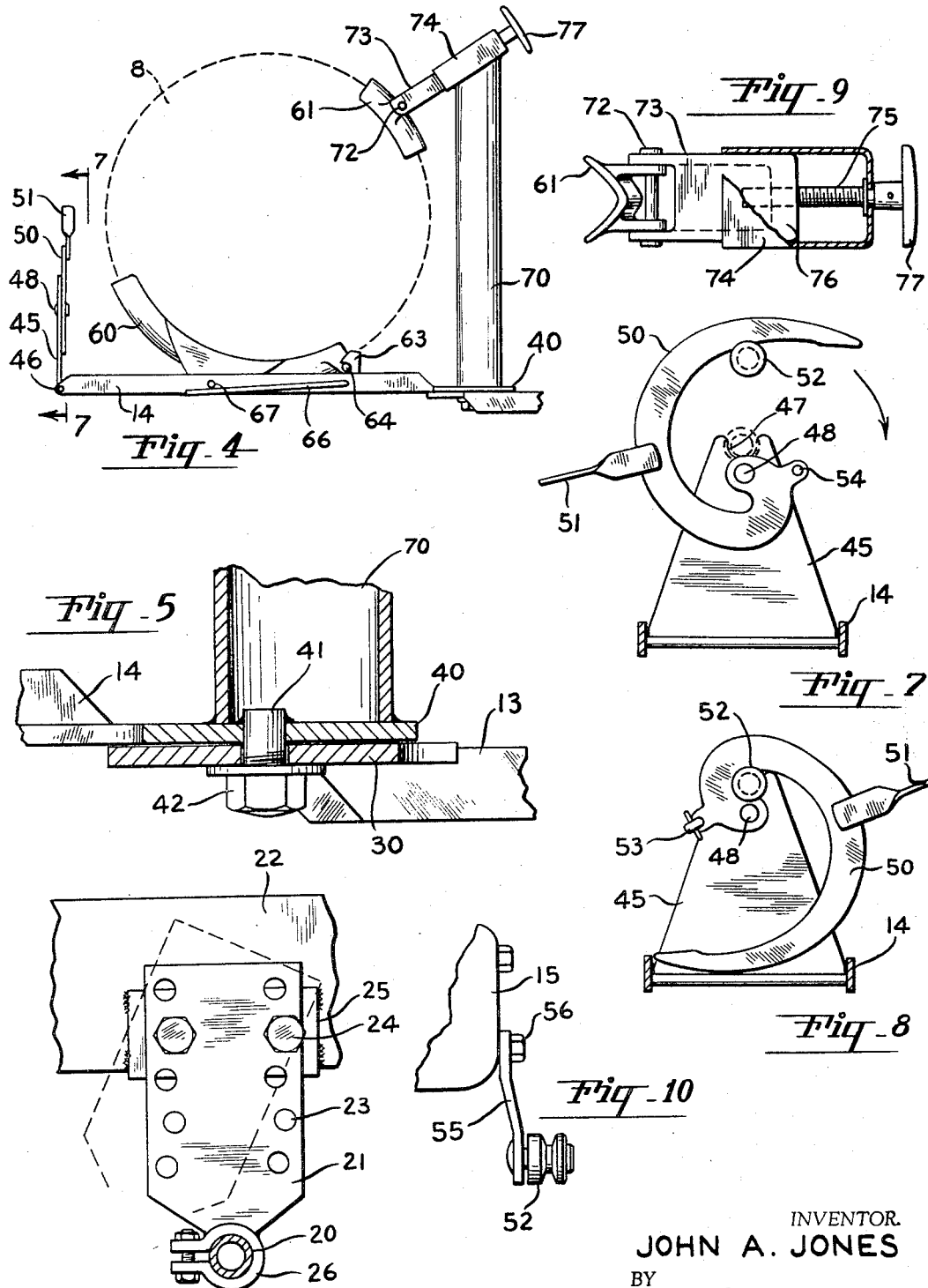

United States Patent Office 3,430,983
Patented Mar. 4, 1969

3,430,983
TRAILER HITCH FOR MOTORCYCLES
John A. Jones, 19104 SE. Clinton St.,
Gresham, Oreg. 97030
Filed Feb. 8, 1967, Ser. No. 614,665
U.S. Cl. 280—402                                       6 Claims
Int. Cl. B62d 53/04; B60p 3/06

ABSTRACT OF THE DISCLOSURE

A hitch-type device for towing one or more motorcycles behind an automobile. The device clamps the front wheel of a motorcycle and holds the front wheel in elevated position so that the motorcycle travels with only its rear wheel on the ground. The device has its own kingpin pivot for turning corners, the front wheel of the motorcycle being clamped in fixed relation to the motorcycle frame so that the front wheel fork will not turn.

Background of the invention

Participants in motorcycle sport riding usually do not ride their motorcycles to the location of the ride but prefer to carry them in light trucks, trailers or in the luggage compartments of their passenger cars. This creates problems and inconvenience in getting the motorcycles into and out of the truck, trailer or automobile. Further, a passenger car luggage compartment will ordinarily hold a single motorcycle. It is desired to provide a better means of transportation for motorcycles on such occasions and for other purposes.

Most motorcycles are too heavy for conventional bumper-mounted bicycle carriers. Even if such a carrier can be used, it is difficult to lift a motorcycle into and out of the carrier.

Summary of the invention

In the present hitch arrangement, a carrier frame on the rear of the towing vehicle supports the front wheel of the motorcycle in raised position so that the motorcycle functions as a one wheel trailer riding on its rear wheel. Thus, the device tows rather than carries the motorcycle. In this way less than thirty percent of the weight of the motorcycle is imposed on the towing vehicle.

The rear end of the carrier frame is arranged to be lowered to the ground so that the front wheel of the motorcycle may be rolled onto the frame without lifting the wheel. Means are provided for clamping the front wheel of the motorcycle rigidly to the carrier frame and means are also provided for securing the carrier frame to the motor or other structural part of the motorcycle whereby the motorcycle is rigidly connected to the carrier frame and stabilized thereby.

Manipulation of the connecting device operates to lift the carrier frame a short distance off the ground without excessive effort and is easily and quickly accomplished. Two or three of the hitch devices may be mounted on an automobile, if desired, for towing a plurality of motorcycles in side by side relation. The device is lightweight, strong, easy to operate, universal in application and folds for storage. Storage when not in use presents no problem as the carrier is small enough that several may be carried in an automobile luggage compartment at one time. The carrier and motorcycle can be mounted and ready to travel in less than sixty seconds time without the use of tools.

Objects of the invention are, therefore, to provide a trailer hitch device for towing a motorcycle behind a towing vehicle, to provide a hitch which does not require direct lifting of the motorcycle, to provide a hitch which stabilizes the motorcycle and will tow a motorcycle safely at passenger car speed, to provide a hitch which tows the motorcycle on its rear wheel, to provide a hitch arrangement capable of towing a plurality of motorcycles behind an automobile, to provide a device which does the work of a trailer without requiring the storage space of a trailer when not in use, to provide a compact and lightweight device equivalent to a trailer which folds for storage and to provide a device of the type described which is economical to manufacture yet sturdy and durable and which may be mounted and put into operation quickly and easily.

The invention will be better understood and additional objects and advantages will become apparent from the following description of the preferred embodiment of the invention illustrated in the accompanying drawings. Various changes may be made, however, in the details of construction and arrangement of parts, and certain features may be used without others. All such modifications within the scope of the appended claims are included in the invention.

Brief description of the drawings

FIGURE 1 is a side elevation view showing the present hitch device in operation;

FIGURE 2 is a similar but enlarged view of the hitch itself;

FIGURE 3 is a view on the line 3—3 in FIGURE 2;

FIGURE 4 is a fragmentary side elevation view showing the carrier frame and front wheel clamping means;

FIGURE 5 is an enlarged view on the line 5—5 in FIGURE 3;

FIGURE 6 is an enlarged view on the line 6—6 in FIGURE 3;

FIGURE 7 is an enlarged view on the line 7—7 in FIGURE 4, showing the cam lift connector in open position;

FIGURE 8 is a view similar to FIGURE 7 showing the cam lift connector in closed position;

FIGURE 9 is an enlarged view on the line 9—9 in FIGURE 2, with parts broken away;

FIGURE 10 is a fragmentary enlarged view of a portion of FIGURE 1; and

FIGURE 11 is an enlarged fragmentary view showing the hanger brackets for the draw bar in FIGURE 1.

Description of the preferred embodiment

In FIGURE 1 the hitch device 10 is shown in operative position for towing the motorcycle 11 behind an automobile 12. The motorcycle has a rear wheel 7, front wheel 8 and a front wheel steering fork 9. The hitch device comprises essentially a V-shaped draw bar unit 13 having pivotal connection with a carrier frame 14 which is clamped to the front wheel 8 and also to some rigid portion of the motorcycle such as its motor 15. The forward end of draw bar unit 13 is detachably connected to a transverse tube 20 which is clamped to the lower ends of a pair of hanger brackets 21 bolted to opposite side members 22 of the auto frame.

Preferably, the hanger brackets 21 are provided with a plurality of holes 23 as shown in FIGURE 11 for flexibility in bolting the brackets to different models of automobiles. Thus, the brackets may be turned to different angular positions, as shown in broken lines, to clear closely adjacent parts of the automobile. Bolts 24 engage tapped holes in a block 25 which is welded to the frame member 22. Clamp 26 for the tube 20 is welded to bracket 21. The two clamps 26 on opposite ends of tube 20 provide adjustability to allow for variations in the lateral spacing of frame members 22 on different automobiles.

As best shown in FIGURE 3, the draw bar unit 13 comprises a pair of forwardly divergent arms welded at their rear ends to a flat bearing plate 30. Connected to the forward end of each arm is a bracket 31 having a semicircular notch 32 to fit the upper side of tube 20. The tube 20 is retained in this notch by means of a latch lever 33 which is pivotally mounted on a pin 34, as shown in FIGURE 6. The forward end of this lever has a nose 35 to engage the underside of tube 20 and hold the tube in notch 32. Tube 20 and hanger brackets 21 are permanently connected with the automobile, and draw bar 13 may be removed by swinging latch levers 33 to broken line position.

Each latch lever 33 has an angular rear end 36 which swings in between the arms of a U-shaped bracket 37 on the draw bar in latched position. Latch lever 33 is locked in this position by a locking pin 38 which is inserted through registering holes in the parts 36 and 37. When the latch lever is thus locked, as shown in solid lines in FIGURE 6, the draw bar may swing up and down on tube 20 with the semicircular notch 32 and nose 35 acting as a bearing on the tube.

The forward end of carrier frame 14 has a flat bearing plate 40 overlying the bearing plate 30, as shown in FIGURE 5. These parts are pivotally connected together by a vertical kingpin stud 41. The upper end of stud 41 is welded in a hole in plate 40, and its lower end passes through a hole in plate 30 permitting the carrier frame 14 to pivot relative to the draw bar in turning a corner. The parts are permanently secured together by a nut 42 which is locked to the stud 41, preferably by welding.

As shown in FIGURES 4, 7 and 8, the rearward end of carrier frame 14 carries a plate 45 hingedly mounted on a transverse pin 46. The free end of this plate contains a notch 47 adjacent the bottom of which is a pin 48 providing pivotal mounting for a spiral shaped cam lever 50 having a handle 51. As will be presently explained, the end of the cam lever 50 is adapted to hook over a grooved roller 52 on the motor of the motorcycle, as shown in FIGURE 7, when the rear end of carrier frame 14 is resting on the ground. Rotation of cam lever 50 operates to raise the carrier frame 14 until the notch 47 is brought up to roller 52, as shown in FIGURE 8. The cam lever is then locked in this position by inserting a pin 53 in the hole 54. Cam lever 50 may be reversed, if desired, to rotate counterclockwise instead of clockwise in its clamping movement.

Roller 52 is mounted on a bracket 55 which is secured to motor 15 by one of the motor bolts 56, as shown in FIGURE 10.

The front wheel 8 of the motorcycle is secured rigidly to carrier frame 14 by a rear tire clamping shoe 60 and a front tire clamping shoe 61, as shown in FIGURES 1 and 4. These shoes are curved longitudinally and transversely to fit the tire on the front wheel. Rear shoe 60 is pivotally mounted on a pin 62 in frame 14. This shoe is arranged to rock back to its FIGURE 2 position to receive the wheel and then rock forward to its FIGURE 4 position for clamping the wheel.

The shoe 60 is latched in its FIGURE 4 position by a pair of latch dogs 63 which engage a transverse pin 64 in the forward end of the shoe. Latch dogs 63 are mounted on a shaft 65 having a rearwardly extending handle 66. The handle is retained in latched position by a pin 67 on frame 14. Pin 67 may be removable or it may be a fixed pin, and the handle 66 may be made of spring material so that it may be sprung outward over the end of the pin, as shown in broken lines in FIGURE 3, to be engaged under the pin.

Front clamping shoe 61 is adjustably mounted on a post 70. The lower end of post 70 is welded to bearing plate 40 on the front end of carrier frame 14, as shown in FIGURE 5. Shoe 61 is pivotally mounted on a transverse pin 72 in the end of a slide 73. Slide 73 is mounted for reciprocation in an inclined tube 74 on the upper end of post 70. A screw shaft 75 is mounted for rotation in a bearing in the upper end of tube 74, this shaft being in threaded engagement with a tapped hole 76 in the upper end of slide 73, as shown in FIGURE 9. A knob 77 is secured to the upper end of the screw shaft for adjusting the slide and clamping the shoe against the tire.

As previously stated, the tube 20 and hanger brackets 21 are left permanently mounted on the vehicle which is to be used for towing. When a motorcycle is to be towed, the draw bar brackets 31 are hooked over the tube 20 and secured thereto by latching levers 33 and locking pins 38. Then, with the rear end of carrier frame 14 resting on the ground and plate 45 resting flat on the ground behind the carrier frame, the front wheel of the motorcycle is rolled into rear shoe 60 while the shoe is tilted rearward in its FIGURE 2 position. Pushing the motorcycle farther forward rocks the shoe 60 forward whereby the shoe may be locked, as shown in FIGURE 4. Then the front shoe 61 is clamped securely against the tire by means of knob 77. Shoe 60 engages a lower rear portion of the front wheel tire and shoe 61 engages an upper front portion, the two shoes being approximately diametrically opposite each other.

With the front wheel thus secured rigidly to carrier frame 14, hinge plate 45 is raised so that the point of cam lever 50 may be engaged over the roller 52 on motor 15. Rotation of the cam lever clockwise in FIGURE 7 raises the carrier frame and the front end of the motorcycle, as shown in FIGURE 1, so that the motorcycle rides with only its rear wheel on the ground and then the cam lever may be locked in its FIGURE 8 position by pin 53. Motorcycles vary considerably in construction, and it is to be understood that the bracket 55 may be adapted for mounting on the motorcycle frame instead of on the motor if there is a frame member in suitable position.

It will be observed that the front wheel 8 of the motorcycle is immobilized and made rigid with the motorcycle frame by the three points of connection of the motorcycle with the carrier frame at 52, 60, 61, so that the front wheel cannot roll and the front wheel fork 9 of the motorcycle cannot turn in steering movement. In turning a corner, all steering movements occur at the kingpin stud 41, rather than in the front wheel fork of the motorcycle. The motorcycle is held upright on its rear wheel 7 by shoes 60 and 61 and prevented from tilting or swaying by the laterally spaced points of bearing of draw bar brackets 31 on tube 20. The lateral spacing of brackets 31 is such as to permit the side-by-side connection of as many as three draw bar units 13 on the tube 20 for towing three motorcycles, if desired. Tube 20 is preferably provided with a plurality of spaced collars or other suitable means (not shown) to prevent the draw bars from sliding along the tube. The draw bar units 13 are free to swing up and down on tube 20 to accommodate an uneven road surface.

For storage, the draw bar portion 13 may be swung on pivot 41 to a position underlying frame 14.

Having now described my invention and in what manner the same may be used, what I claim as new and desire to protect by Letters Patent is:

1. A hitch device for towing a motorcycle behind a towing vehicle comprising a carrier frame, means on said frame for clamping the front wheel tire of the motorcycle on top of said frame, means for connecting the rear end of said frame with a part of the motorcycle between its front and rear wheels, a kingpin pivot on the front end of said frame, a draw bar pivotally connected with said kingpin pivot, means for connecting said draw bar with the towing vehicle, said last means allowing the rear end of said carrier frame to rest on the ground so that the front wheel of the motorcycle may be rolled onto said frame, said tire clamping means comprising a first curved clamping shoe arranged to engage the tire on the rear side of said front wheel and a second curved clamping shoe arranged to engage said tire on the front side of said wheel, said first shoe being pivotally mounted on said carrier frame to rock backward to receive said wheel and to rock forward to tire clamping position at a low point on said wheel, and means to lock said shoe in said clamping position.

2. A hitch device for towing a motorcycle behind a towing vehicle comprising a carrier frame, means on said frame for clamping the front wheel tire of the motorcycle on top of said frame, means for connecting the rear end of said frame with a part of the motorcycle between its front and rear wheels, a kingpin pivot on the front end of said frame, a draw bar pivotally connected with said kingpin pivot, means for connecting said draw bar with the towing vehicle, said last means allowing the rear end of said carrier frame to rest on the ground so that the front wheel of the motorcycle may be rolled onto said frame, said tire clamping means comprising a first curved clamping shoe arranged to engage the tire on the rear side of said front wheel and a second curved clamping shoe arranged to engage said tire on the front side of said wheel, said second shoe being mounted on a post on said carrier frame to engage said tire at a high point on said wheel, and means to tighten and release said second shoe.

3. A hitch device as defined in claim 2, said kingpin pivot and said post being mounted on the front end of said carrier frame.

4. A hitch device for towing a motorcycle behind a towing vehicle comprising a carrier frame, means on said frame for clamping the front wheel tire of the motorcycle on top of said frame, means for connecting the rear end of said frame with a part of the motorcycle between its front and rear wheels, a kingpin pivot on the front end of said frame, a draw bar pivotally connected with said kingpin pivot, and means for connecting said draw bar with the towing vehicle, said last means allowing the rear end of said carrier frame to rest on the ground so that the front wheel of the motorcycle may be rolled onto said frame, said means for connecting the rear end of said carrier frame with a part of the motorcycle including a connector device arranged to lift the rear end of said carrier frame from said ground rest position to an elevated position by mechanical leverage.

5. A hitch device as defined in claim 4, said connector device comprising a roller on the motorcycle and a spiral shaped cam on said carrier frame arranged to hook over said roller.

6. A hitch device as defined in claim 5, including a plate pivotally mounted on the rear end of said carrier frame, said cam being mounted for rotation on said plate.

References Cited

UNITED STATES PATENTS

| | | | |
|---|---|---|---|
| 1,864,781 | 6/1932 | Wells | 280—402 |
| 2,789,832 | 4/1957 | Zumwalt | 280—292 |
| 2,988,382 | 6/1961 | Holland | 280—402 X |

FOREIGN PATENTS

| | | |
|---|---|---|
| 904,744 | 2/1954 | Germany. |
| 528,171 | 6/1955 | Italy. |

LEO FRIAGLIA, *Primary Examiner.*

U.S. Cl. X.R.

280—292, 494